May 22, 1951 H. J. SIEKMANN ET AL 2,553,984
ELECTRIC DUPLICATOR ATTACHMENT FOR LATHES
Filed June 24, 1947 4 Sheets-Sheet 1

INVENTORS.
HAROLD J. SIEKMANN
AND HARRY C. KEMPER
BY Toulmin & Toulmin
ATTORNEYS.

May 22, 1951   H. J. SIEKMANN ET AL   2,553,984
ELECTRIC DUPLICATOR ATTACHMENT FOR LATHES

Filed June 24, 1947   4 Sheets-Sheet 3

INVENTORS.
HAROLD J. SIEKMANN
AND HARRY C. KEMPER
BY
Toulmin & Toulmin
ATTORNEYS.

May 22, 1951     H. J. SIEKMANN ET AL     2,553,984
ELECTRIC DUPLICATOR ATTACHMENT FOR LATHES

Filed June 24, 1947     4 Sheets-Sheet 4

INVENTORS.
HAROLD J. SIEKMANN
AND HARRY C. KEMPER
BY
Toulmin & Toulmin
ATTORNEYS.

Patented May 22, 1951

2,553,984

UNITED STATES PATENT OFFICE 2,553,984

ELECTRIC DUPLICATOR ATTACHMENT FOR LATHES

Harold J. Siekmann, Cincinnati, and Harry C. Kemper, Goshen Township, Clermont County, Ohio, assignors to The R. K. Le Blond Machine Tool Co., Cincinnati, Ohio, a corporation of Delaware Application June 24, 1947, Serial No. 756,618

4 Claims. (Cl. 82—14)

1

This invention pertains to improvements in electric duplicator attachments. More particularly, this invention is directed to improvements in the arrangement, construction, and operation of electric controlled duplicator attachments for lathe.

In the construction of a duplicating attachment for lathe, which may be substituted for the normal compound rest, to actuate the cutting tool in tracer controlled motion from a template during the longitudinal feeding movement of the carriage, it is essential to provide an apparatus which is small and compact, and yet powerful and accurate, to actuate the tool and at the same time not interfere with the normal placement or removal of the work from the lathe nor interfere with the proper setting, adjustment, and examination of the tool during the cutting operation. It is also essential to design such an electric tracer control unit with a minimum of exterior dimension while at the same time providing a powerful and accurate drive under electric tracer control for actuating the cutting tool of the lathe. The apparatus must also be so located in relation to the cutting tool and its actuating tool slide as to balance the unit for efficient relative movement of work and tool by the tracer control mechanism.

One of the objects of this invention is to provide a small, compact, electrically operated tracer control duplicating attachment which may be substituted for the compound rest tool slide mechanism of a lathe.

Another object of this invention is to provide an improved electric tracer control unit for a compound rest tool slide of a lathe having a minimum of over-all dimension so as not to interfere with the operation of the lathe.

It is also an object of this invention to provide an improved power transmission from the actuating motor to the tool feeding screw for an electric duplicator attachment for lathe.

It is a further object to provide a tracer controlled duplicating attachment for a compound rest for a lathe which may be readily operated manually as an ordinary compound rest when the electric tracer control is de-energized and not in use.

It is a still further object of this invention to provide, in conjunction with an electric duplicator attachment for lathe, an improved arrangement for supporting the template on the tool slide in such a way that the slide may be swiveled to any desired angular position of approach or retraction from the work while main-

2 taining a rigid locked support for the relative movement of the template and the finger of the electric tracer mechanism.

Further features and advantages of this invention will appear from a detailed description of the drawings in which.

Figure 1:
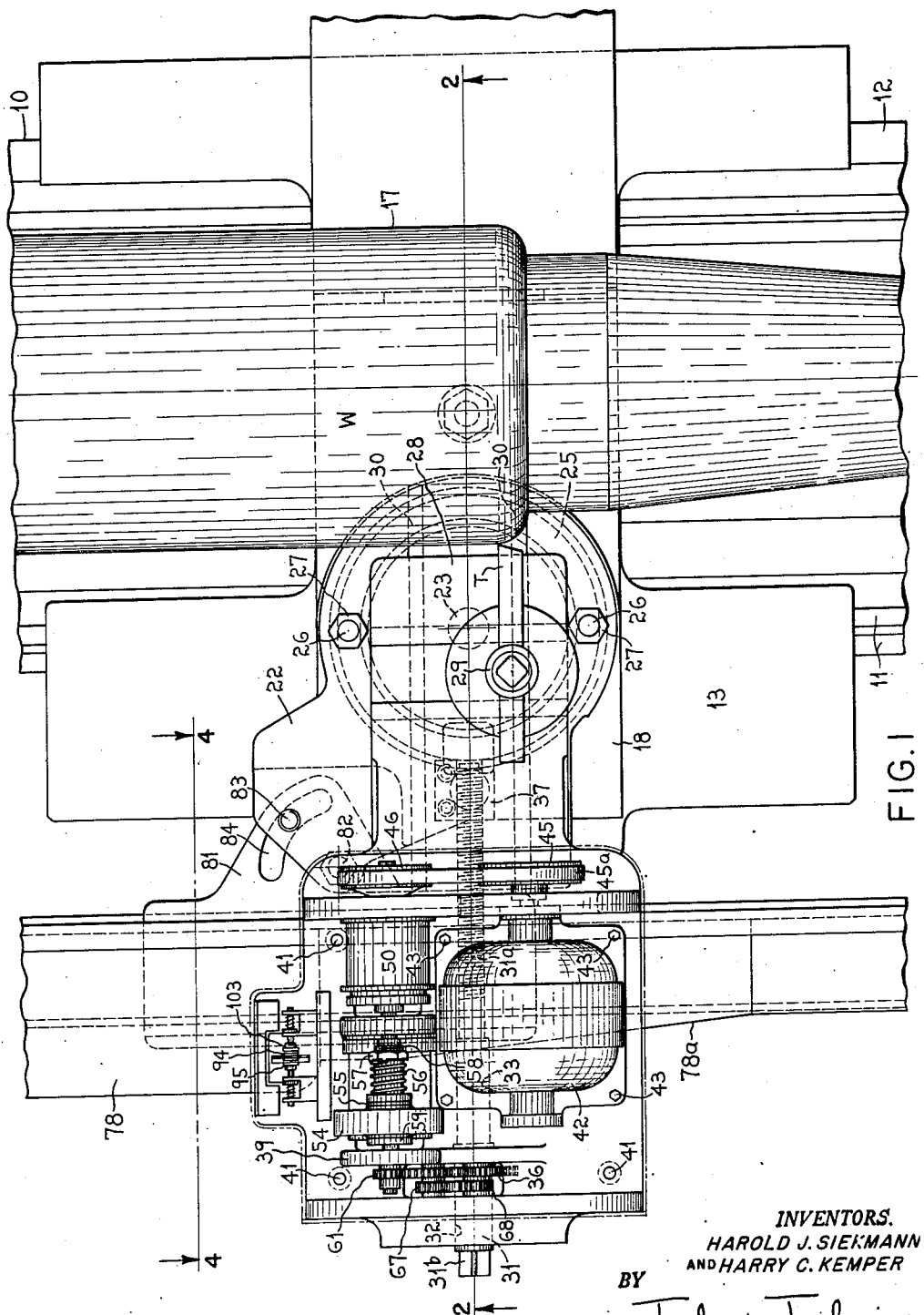
Figure 1 is a fragmentary plan view showing the application of the improved electric tracer duplicator device to a lathe.

For exemplary purposes, this invention is shown applied to a typical engine lathe having a bed 10 on the ways 11 and 12 of which is mounted the lathe carriage 13 which may be actuated in longitudinal feeding movement by the usual lathe apron 14 and feed rod or lead screw 15 in a conventional manner to traverse the tool T in feeding movement longitudinally of the axis of rotation 16 of the lathe work spindle to machine the work surface 17 of a work piece W mounted and rotated in the lathe in the usual manner.

On top of the lathe carriage is provided the usual lathe cross slide 18 on suitable dovetailed guideways 19 and which may be adjustable in transverse movement by the usual cross feed screw 20 operated by the cross feed handle 21 in the usual manner for setting depth adjustments for the tool T with respect to the work W.

The electric duplicator attachment is a completely self-contained unit and is all carried on a bottom swivel slide 22 which has a pilot hole 23 nicely fitting around the usual pivot stud 24 of the regular compound rest of the lathe which it merely replaces. The usual annular T slot groove 25, provided with the clamping bolts 26 and clamping nuts 27, is utilized for securing the compound rest to the cross slide of the lathe, also utilized to fix the bottom swivel slide 22 of the attachment in any desired angular position on the lathe cross slide 18.

Figure 2:
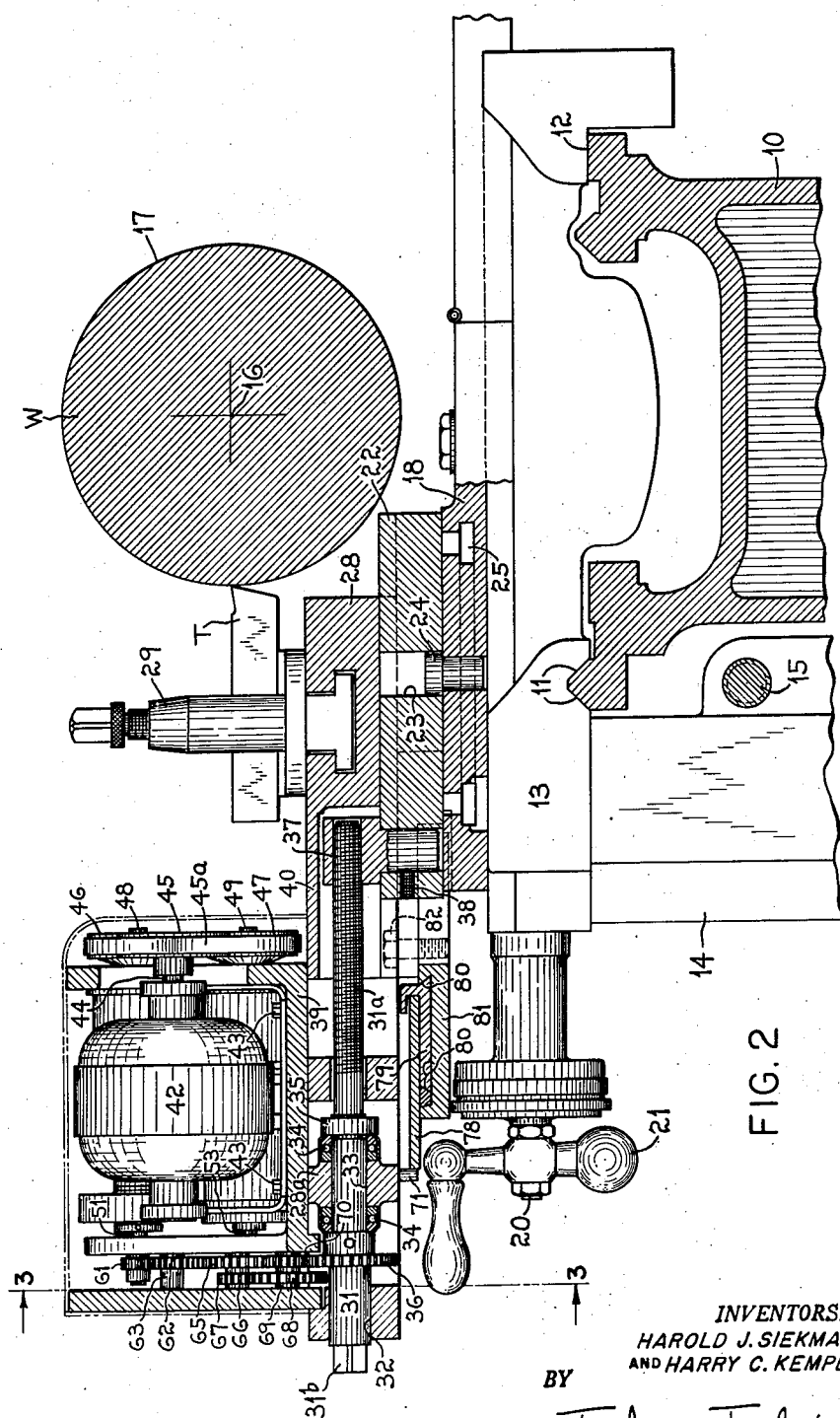
Figure 2 is a fragmentary enlarged vertical transverse section through the lathe and duplicator attachment on the line 2—2 of Figure 1.

The tool actuating device for the tool slide 28 carrying the tool post 29 containing the cutting tool T is mounted to reciprocate on the dovetailed guideways 30 and is actuated in such reciprocatory movement by means of the tool slide actuating screw 31 which is journaled in bearings 32 and 33 in the tool slide 28 and journaled against axial movement by suitable thrust bearings 34 engaging each side of a ribbed portion 28a of the tool slide 28, as best seen in Figure 2, the bearings being confined between a collar 35 and a gear 36 fixed to the actuating screw 31. The screw has a threaded portion 31a which operates in a nut 37 fixed by a suitable set screw 38 in the bottom swivel slide 22 of the attachment. Thus, rotation of the screw 31 in one direction or the other adjusts the relative movement and position of the tool slide 28 with respect to the work piece in any direction relative to the movement of the carriage 13 along the bed depending upon where the swivel slide 22 is positioned and locked by the clamping screws 26 and nuts 27.

Figure 3:
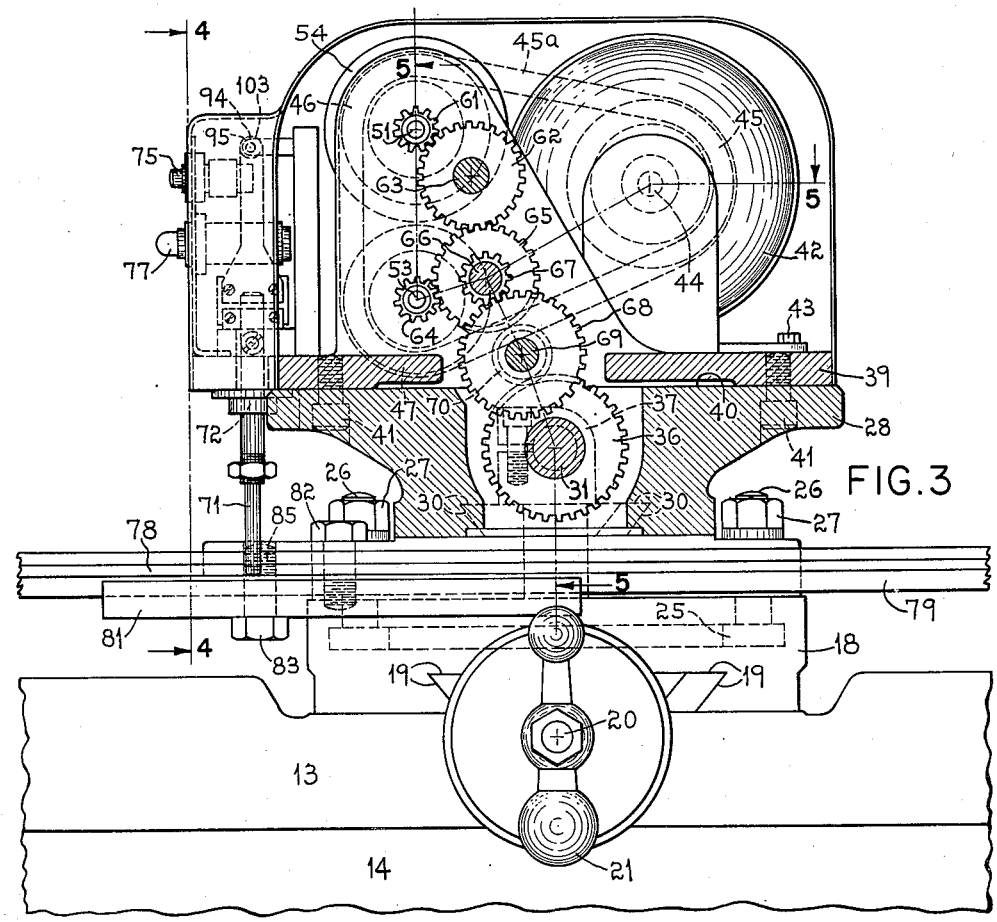
Figure 3 is an enlarged vertical section on the line 3—3 of Figure 2.

The actuating screw 31 may be rotated manually by means of the squared end portion 31b for initial positioning of the cutting tool T as in an ordinary compound rest arrangement. The screw 31 is also automatically controlled by electric tracer control mechanism so as to automatically position the tool T and the slide 28 to effect automatic form turning, copying, or contour forming of the work surface 17 of the work piece W. The power transmission mechanism and electric tracer control associated therewith for controlling the rotation of the tool actuating screw 31 to effect form turning operations is wholly self-contained in a frame structure 39 which is mounted on the top surface 40 of the tool slide 28 by suitable screws 41, as best seen in Figure 3. This frame 39 carries the main constantly operating drive motor 42 secured to it by suitable bolts 43, the motor having a shaft 44 on which is fixed the drive pulley 45. A belt 45a, operating over the pulley 45 is also in operative engagement with the pulleys 46 and 47 on the respective drive shafts 48 and 49 journaled in the frame 39 in any suitable manner. The shaft 48 is connectable through a magnetic clutch 50 with an output shaft 51 journaled in the frame 39 while the shaft 49 is connectable through a magnetic clutch 52 to drive an output shaft 53 also journaled suitably in the frame 39. On the shaft 51 is journaled a flywheel 54 frictionally restricted in free rotary movement on the shaft 51 by engagement of a friction disc 55 against the flywheel 54 by the compression spring 56 which is confined and adjusted in pressure by a nut 57 carried on a suitable sleeve 58 fixed to the shaft 51, thrust from the spring 56 being taken up through the flywheel 54 by a suitable collar 59 fixed to the shaft 51.

The shaft 53 is connected through a magnetic brake 60 rigidly supported on the frame 39, which magnetic brake 60 is adapted to arrest rotation of the shaft 53.

Figure 5:
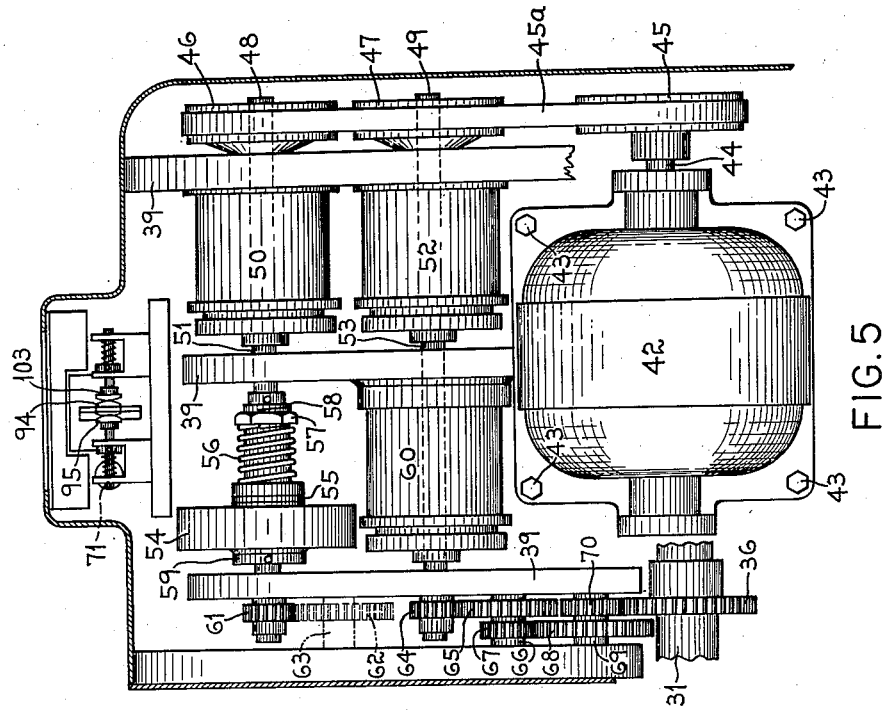
Figure 5 is a diagrammatic stretched-out view showing the transmission mechanism indicated by the line 5—5 in Figure 3.

Referring particularly to Figures 3 and 5, on the shaft 51 is fixed a drive pinion 61 which drives a gear 62 journaled on a suitable shaft 63 fixed in the frame 39 while on the shaft 53 is fixed a drive pinion 64 which in turn drives the gear 65 journaled on a shaft 66 fixed in the frame 39. The shafts 63 and 66 are so positioned in the frame 39 that the gears 62 and 65 operate in driving engagement, as best seen in Figure 3. The gear 65 has fixed to it a second gear 67 which may be thus rotated in one direction or the other by appropriately operating the magnetic clutch 50 to connect driving power to the shaft 51 or operating the magnetic clutch 52 to connect driving power to the shaft 53 since in one case the gear 67 is driven through the gear train 61, 62, and 65, whereas in the other instance the gear 67 is driven only through the gears 64 and 65 to thus effect the reversal driving from the same direction of rotation for the shafts 51 and 53 as effected by the drive motor and common belt 45a operating over the pulleys 46 and 47 as described.

Figure 4:
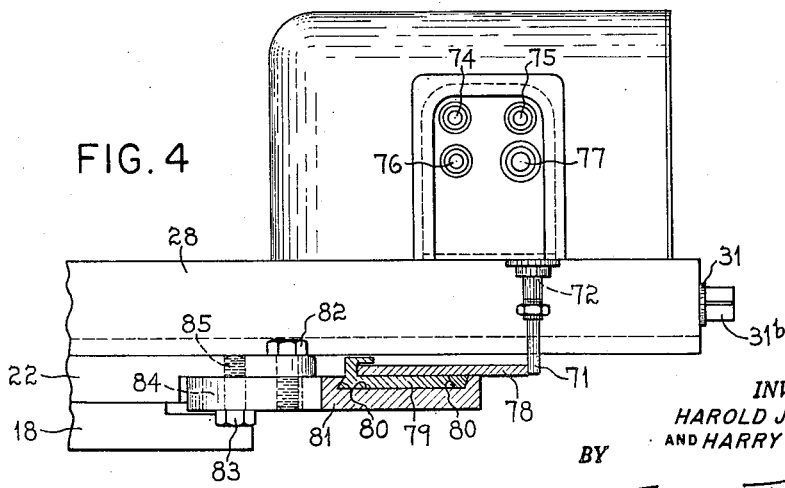
Figure 4 is an enlarged fragmentary left-hand side view of the attachment indicated by the line 4—4 in Figure 3.

The gear 67 in turn drives a gear 68 journaled on a shaft 69 suitably carried in the frame 39, the gear 68 having an associated gear 70 fixed to it which is positioned so as to drive the gear 36 fixed on the tool actuating screw 31. It can thus be seen that by removing the screws 41, the entire power transmission, including the motor 42, the magnetic clutches 50 and 52, magnetic brake 60, the flywheel 54, and the gear train transmission down to and including the gear 70 may be bodily removed from the tool slide 28 for repair, adjustment, or replacement without, in any way, effecting the operation of the tool slide 28 in a manual fashion in the ordinary use of the apparatus as a compound rest for the lathe. It is also to be noted that the electric tracer mechanism, which may be of any usual form having a tracer stylus 71 universally mounted at 72 and spring biased by suitable spring 73 in a well-known conventional manner, is also carried on the frame 39 as are the various controls such as the in-button 74, the out-button 75, and the automatic button 76, and indicating light 77, Figure 4, so that all of this mechanism, including the electric tracer and associated electrical wiring and control mechanisms, is self-contained and mounted and carried by the frame 39.

The tracer finger or stylus 71 may preferably be actuated from a form template pattern 78 which is fixed to a template or pattern slide 79 guided on suitable guideway surfaces 80 in a guide plate 81 carried by and adjustably fixed to the bottom swivel slide 22 by a suitable pivot screw 82 and a clamping screw 83 extending through the arcuate clamp slot 84 formed in the guide plate 81 and threaded into the bottom swivel slide 22 at 85. By loosening the screw 83 and the nuts 27, the bottom slide 22 may be positioned in any angular location on the cross slide and carriage of the lathe and then locked in place again by tightening the screws 27 and locking the screw 83 so as to rigidly hold the guide plate member 81 to the bottom slide while maintaining the guideways 80 for the template slide 79 in position substantially parallel to the longitudinal movement of the carriage on the bedways of the lathe. Thus, in order to effect the form turning operation, the template slide 79 is held against movement by suitable means attached to the bed of the lathe (not shown) while the carriage relatively feeds along the bed moving the guide member 81 relatively along the template slide 79 and carrying with it the attachment and tracer finger or stylus 71 along the surface contour 78a of the template 78 to effect an automatic form turning operation for the cutting tool T.

Figure 6:
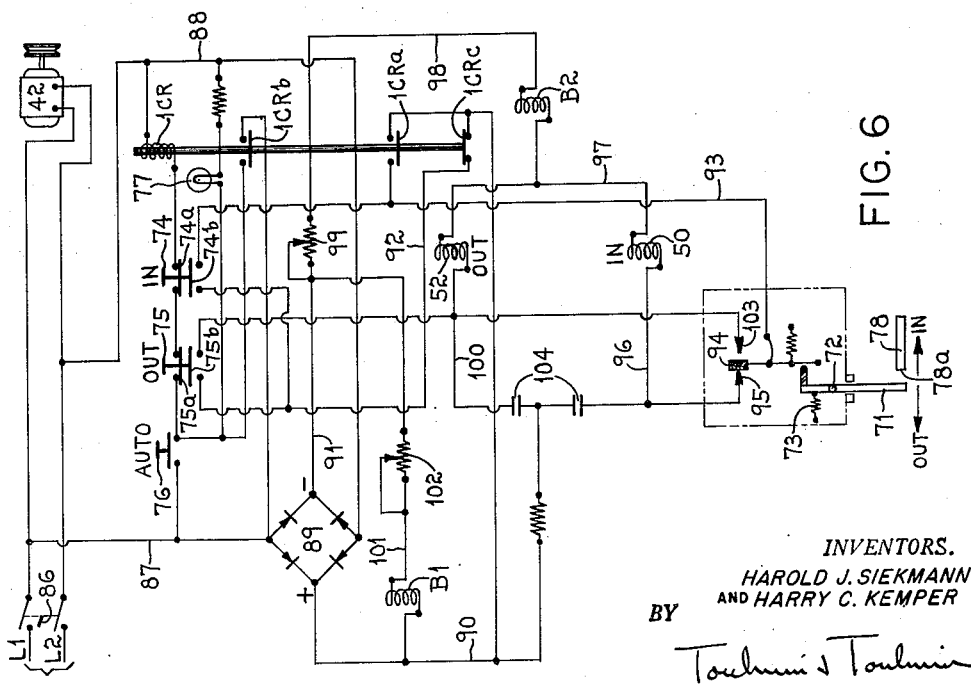
Figure 6 is the electric circuit diagram for the duplicator attachment.

The electrical control circuit shown in Figure 6, which may preferably be used to effect the automatic control of the magnetic clutches 50 and 52 and the magnetic brake 60 in a predetermined manner, may comprise a suitable single-phase A. C. supply L1 and L2 which is connected to the circuit by closing the main line switch 86 to energize the drive motor 42 for continuous operation and constant speed. Power take-off from the leads L1 and L2 is transmitted through the leads 87 and 88 to the rectifier 89 which applies a positive direct potential to the lead 90 and a negative direct potential to the lead 91. Assuming the tool slide 28 to be in retracted position, to the left in Figure 2, with the tool T completely away from the work and the tracer stylus 71 away from the template 78, the tool slide may be initially moved in toward the work by pressing the in-push button 74 which opens contact 74a and closes contact 74b to connect power from the lead 90 through the normally closed contact 1CRa and the lead 92 through the lead 93, stylus operated contact 94 of the tracer and its contact 95, to the lead 96 to energize the in-movement magnetic clutch 50 connected by the lead 97 through the coil B2 of the magnetic brake 60 which in turn is connected to the lead 98, the variable resistor 99 to the lead 91. The tracer is so arranged that when its stylus 71 is free and released from contact with the template 78, a bias spring 73 maintains the contact 94 normally in contact with the contact 95, as shown in Figure 6.

When it is desired to move the tool T out away from the work, the out-push button 75 may be pressed, opening contact 75a and closing contact 75b which connects lead 90 through the normally closed contact 1CRa to the lead 100 which energizes the out magnetic clutch 52 which in turn is connected through the lead 97, the coil B2 of the magnetic brake 60, the lead 98, the variable resistor 99 to the lead 91. The in-push button 74 and the out-push button 75 are momentary contact buttons which normally have their contacts 74a and 75a closed when released.

The magnetic brake 60 having the coils B1 and B2 is so constructed that the brake is set to prevent rotation of the shaft 53 when only coil B1 is energized and the brake is released when both coils B1 and B2 are energized. Since the coil B1 is continuously energized from lead 90 through the lead 101, variable resistor 102 and the lead 91, and the coil B2 is energized only when in magnetic clutch 50 or out magnetic clutch 52 is energized, as described, the brake 60 is released when either of these magnetic clutches is energized and the brake is set when both of these clutches are de-energized.

The screw 31 may be manually operated for actuating the tool slide 28 as an ordinary compound rest by de-energizing both coils B1 and B2 of the magnetic brake and the magnetic clutches 50 and 52 by opening the line switch 86 to render the tracer control inoperative. The tracer stylus 71 and template forms 78 may be removed to allow any desired travel of the tool slide under manual operation of the screw 31.

To effect automatic operation, the automatic momentary contact button 76 is pressed, completing the circuit from the lead 87 through the normally closed contacts 75a and 74a to energize the relay 1CR, in turn connected to the lead 88. This causes contact 1CRb to close to latch in the coil 1CR after the momentary automatic push button 76 is released. Contact 1CRa is also open at this time while contact 1CRc is closed. Power is then applied to the lead 90 through the closed contact 1CRc and the lead 93 to the contact 94 of the tracer which, at this time, has its stylus 71 away from the template 78 so that contact 94 is in engagement with contact 95, completing a circuit through the lead 96 to the magnetic clutch 50 to energize this clutch to cause the tool slide to move towards the work, bringing the tool T up to cutting position, and bringing the stylus 71 of the tracer into engagement with the template 78.

When the tracer stylus 71 engages the template 78, the contact 94 is moved to a neutral disconnected position, breaking its connection with the contact 95 to thus de-energize the in magnetic clutch 50 and stop further in-movement of the tool slide 28. The feeding movement of the carriage 13 along the bed may now be instituted to cause the tracer stylus 71 to follow along the contour surface 78a of the template 78 and thus actuate the tracer so as to move the contact 94 either into contact with contact 95 or with contact 103 for alternately energizing and de-energizing the in and out magnetic clutches 50 and 52 to effect controlled positioning of the tool slide 28 in response to the shape and configuration of the surface 78a on the template 78.

During this alternate operation of the in and out magnetic clutches 50 and 52, the brake 60 is also automatically operated by energizing and de-energizing its coil B2 as described so that whenever one of the in or out magnetic clutches is de-energized, the brake 60 immediately becomes effective to stop rotation of the screw 31 and whenever one of these magnetic clutches 50 or 52 is energized, the brake 60 is immediately released.

It is also to be noted that whenever a magnetic clutch is energized to effect a drive to the screw 31 in one direction or the other or when these magnetic clutches are de-energized, the acceleration and deceleration is further damped, in addition to the operation of the brake 60, by the friction damping flywheel 54. Thus the simultaneous functioning of the brake 60 and the friction damping flywheel 54 in conjunction with the alternate energizing of the in and out magnetic clutches 50 and 52 effects a highly accurate and precision control of the tool movements in response to the configuration of the template 78.

It is to be noted that if either in-push button 74 or the out-push button 75 is pressed, the automatic control cycle is stopped so that the operator immediately resumes manual control of the servo mechanism. Whenever either of these push buttons are depressed, their respective contacts 74a and 74b break the circuit to the relay 1CR so as to again open contacts 1CRb and 1CRc and reestablish the contact 1CRa for manual control of the in and out clutches 50 and 52 as described. An indicating light 77 may also be preferably used to indicate that the automatic control has been established for starting the length feed of the lathe in actuating the carriage 13 along the bed 10 to give a further degree of nicety and safety to the lathe. Also, arc suppressing means comprising the two capacitors 104 may be utilized to suppress the arc on the push buttons 74 and 75 of the manual control and also to suppress the arc between the contacts 94, 95, and 103.

There has thus been provided an electrically operated tracer controlled copying attachment for a lathe which is arranged in a completely self-contained unit including the tool actuating slide, all of which may be mounted in the carriage of the lathe in place of the usual compound rest thereof. The apparatus is furthermore arranged that the entire power transmission, control clutches, and magnetic and friction damping mechanisms, together with the tracer control device and entire electrical apparatus, is contained in a unitary housing or frame which may be readily applied to or removed from the tool slide as a unit without effecting the normal use of the tool slide as a regular compound rest slide for the lathe.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

Having thus fully set forth and described this invention, what is claimed as new and desired to be secured by United States Petters Patent is:

1. A machine tool mechanism including a lathe having a bed, a carriage longitudinally movable on said bed, a lead screw interacting between said bed and said carriage operable to affect said relative longitudinal movement of the carriage on the bed, a cross slide transversely movable on said carriage, a cross feed screw interacting between said carriage and cross slide operable to affect relative transverse adjustment of said cross slide on said carriage, a swivel slide pivotally mounted on said cross slide including clamping means for locking said swivel slide in any desired swivelled position, a tool slide movably mounted on said swivel slide, having tool slide screw interacting between said swivel slide and said tool slide actuable to affect relative movement of said tool slide on said swivel slide, a frame mounted on said tool slide, means on said frame for actuating said tool slide screw including a separable drive connection to said screw whereupon said tool slide screw may be manually operated upon the de-energizing of said drive means for said tool slide screw and when said frame and contained mechanism is removed from said tool slide.

2. A machine tool mechanism including a lathe having a bed, a carriage longitudinally movable on said bed, a lead screw interacting between said bed and said carriage operable to affect said relative longitudinal movement of the carriage on the bed, a cross slide transversely movable on said carriage, a cross feed screw interacting between said carriage and cross slide operable to affect relative transverse adjustment of said cross slide on said carriage, a swivel slide pivotally mounted on said cross slide including clamping means for locking said swivel slide in any desired swivelled position, a tool slide movably mounted on said swivel slide, having a tool slide screw interacting between said swivel slide and said tool slide actuable to affect relative movement of said tool slide on said swivel slide, a means carried on said tool slide for actuating said tool slide screw, comprising a motor, a belt drive transmission connecting said motor to reversing clutch means, a driving connection from said reversing clutch means to said tool slide screw, a friction flywheel and a brake interconnected between said reversing clutch means and said driving connection, and a tracer connected to control said reversing clutch means and said brake, and means automatically disconnecting said driving connection from said tool actuating screw when said aforementioned driving means is removed from said tool slide while said tool slide actuating screw remains manually operative to move said tool slide on said swivel slide.

3. A machine tool mechanism including a lathe, having a bed, a carriage longitudinally movable on said bed, a lead screw interacting between said bed and said carriage operable to affect said relative longitudinal movement of the carriage on the bed, a cross slide transversely movable on said carriage, a cross feed screw interacting between said carriage and cross slide operable to affect relative transverse adjustment of said cross slide on said carriage, a swivel slide pivotally mounted on said cross slide including clamping means for locking said swivel slide in any desired swivelled position, a tool slide movably mounted on said swivel slide, having a tool slide screw interacting between said swivel slide and said tool slide actuable to affect relative movement of said tool slide on said swivel slide, a means carried on said tool slide for actuating said tool slide screw, comprising a motor, a belt drive transmission connecting said motor to reversing clutch means, a driving connection from said reversing clutch means to said tool slide screw, a friction flywheel and a brake interconnected between said reversing clutch means and said driving connection, and a tracer connected to control said reversing clutch means and said brake, and means automatically disconnecting said driving connection from said tool actuating screw when said aforementioned driving means is removed from said tool slide while said tool slide actuating screw remains manually operative to move said tool slide on said swivel slide and means for actuating said tracer including a template, means for supporting said template on said swivel slide and means for restricting said template against relative longitudinal movement with respect to said bed.

4. A machine tool mechanism including a lathe having a bed, a carriage longitudinally movable on said bed, a lead screw interacting between said bed and said carriage operable to affect said relative longitudinal movement of the carriage on the bad, a cross slide transversely movable on said carriage, a cross feed screw interacting between said carriage and cross slide operable to affect relative transverse adjustment of said cross slide on said carriage, a swivel slide pivotally mounted on said cross slide including clamping means for locking said swivel slide in any desired swivelled position, a tool slide movably mounted on said swivel slide, having tool slide screw interacting between said swivel slide and said tool slide actuable to affect relative movement of said tool slide on said swivel slide, a frame mounted on said tool slide, means on said frame for actuating said tool slide screw including a separable drive connection to said screw whereupon said tool slide screw may be manually operated upon the de-energizing of said drive means for said tool slide screw and when said frame and contained mechanism is removed from said tool slide, said drive means for said tool slide actuating screw including a motor, a belt drive connecting said motor to reversing clutch means, and a driving connection including a friction flywheel, and a brake, for controlling power from said motor to said tool slide screw, and a tracer mounted on said frame connected to said reversing clutch means and said brake and operable to affect a predetermined sequential control of said reversing clutches and brake, and means for actuating said tracer comprising a template support on said swivel slide for relative movement with respect to said tracer upon longitudinal movement of said clutch on said bed.

HAROLD J. SIEKMANN.
HARRY C. KEMPER.

(References on following page)

REFERENCES CITED

The following references are of record in the file of this patent:

UNITED STATES PATENTS

| Number | Name | Date |
|---|---|---|
| 1,166,126 | Gridley | Dec. 28, 1915 |
| 1,195,293 | Townsend | Aug. 22, 1916 |
| 1,477,186 | Randolph | Dec. 11, 1923 |
| 1,711,290 | Shaw | Apr. 30, 1929 |
| 2,065,933 | Blanchard | Dec. 29, 1936 |
| 2,330,354 | Hepburn | Sept. 28, 1943 |
| 2,351,649 | Wintermute | June 20, 1944 |
| 2,376,405 | Turchan | May 22, 1945 |
| 2,437,570 | Von Zelewsky | Mar. 9, 1948 |
| 2,474,134 | Waterson | June 21, 1949 |